United States Patent
Endo et al.

(10) Patent No.: US 12,240,536 B2
(45) Date of Patent: Mar. 4, 2025

(54) CONTROL DEVICE AND CONTROL METHOD FOR ELECTRIC POWER STEERING APPARATUS, AND MOTOR MODULE

(71) Applicant: Nidec Corporation, Kyoto (JP)

(72) Inventors: Shuji Endo, Kyoto (JP); Hiroaki Mizushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 193 days.

(21) Appl. No.: 17/928,946

(22) PCT Filed: Jun. 9, 2021

(86) PCT No.: PCT/JP2021/021976
§ 371 (c)(1),
(2) Date: Dec. 1, 2022

(87) PCT Pub. No.: WO2021/256354
PCT Pub. Date: Dec. 23, 2021

(65) Prior Publication Data
US 2023/0227098 A1    Jul. 20, 2023

(30) Foreign Application Priority Data

Jun. 17, 2020   (JP) ................ 2020-104210

(51) Int. Cl.
*B62D 5/04* (2006.01)
*B62D 6/00* (2006.01)
(52) U.S. Cl.
CPC ............. *B62D 5/04* (2013.01); *B62D 6/00* (2013.01)

(58) Field of Classification Search
CPC ........... B62D 5/04; B62D 5/0463; B62D 6/00
See application file for complete search history.

(56) References Cited

U.S. PATENT DOCUMENTS

| | | | |
|---|---|---|---|
| 2002/0026270 A1* | 2/2002 | Kurishige | B62D 15/0245 180/443 |
| 2016/0129934 A1 | 5/2016 | Akatsuka et al. | |
| 2018/0037256 A1* | 2/2018 | Maeda | B62D 6/008 |
| 2018/0099690 A1* | 4/2018 | Oya | B62D 5/0463 |
| 2019/0161116 A1* | 5/2019 | Moreillon | B62D 15/025 |
| 2019/0263446 A1* | 8/2019 | Tsubaki | B62D 6/00 |
| 2019/0329818 A1* | 10/2019 | Shoji | B62D 15/025 |

(Continued)

FOREIGN PATENT DOCUMENTS

| | | | |
|---|---|---|---|
| JP | 2012-218498 A | 11/2012 | |
| JP | 2015-033942 A | 2/2015 | |

(Continued)

OTHER PUBLICATIONS

Official Communication issued in International Patent Application No. PCT/JP2021/021976, mailed on Aug. 24, 2021.

*Primary Examiner* — Long T Tran
(74) *Attorney, Agent, or Firm* — Keating & Bennett, LLP

(57) ABSTRACT

In a control device to control a motor in an electric power steering apparatus including the motor, processor executes, according to a program calculation of a target assist torque by performing proportional integral (PI) control based on a target steering wheel angle and a steering angle, and control of the motor based on the target assist torque. A gain of an integrator used for integral (I) control of the PI control is variable.

17 Claims, 5 Drawing Sheets

(56) References Cited

U.S. PATENT DOCUMENTS

| | | | |
|---|---|---|---|
| 2020/0010111 A1* | 1/2020 | Tsubaki | B62D 5/0463 |
| 2020/0039576 A1* | 2/2020 | Shoji | B62D 15/025 |
| 2020/0290668 A1 | 9/2020 | Moreillon et al. | |
| 2021/0206426 A1* | 7/2021 | Kitazume | B62D 5/0409 |
| 2021/0300464 A1* | 9/2021 | Kodera | B62D 5/0484 |

FOREIGN PATENT DOCUMENTS

| | | |
|---|---|---|
| JP | 2016-088436 A | 5/2016 |
| JP | 2017-177943 A | 10/2017 |
| JP | 2020-075577 A | 5/2020 |
| WO | 2019/107437 A1 | 6/2019 |

* cited by examiner

CONTROL DEVICE AND CONTROL METHOD FOR ELECTRIC POWER STEERING APPARATUS, AND MOTOR MODULE

CROSS-REFERENCE TO RELATED APPLICATIONS

This is a U.S. national stage of application No. PCT/JP2021/021976, filed on Jun. 9, 2021, and with priority under 35 U.S.C. § 119(a) and 35 U.S.C. § 365 (b) being claimed from Japanese Patent Application No. 2020-104210, filed on Jun. 17, 2020, the entire disclosures of which are hereby incorporated herein by reference.

1. FIELD OF THE INVENTION

The present disclosure relates to a control device and a control method for an electric power steering apparatus, and a motor module. The present application claims priority based on Japanese Patent Application No. 2020-104210 filed in Japan on Jun. 17, 2020, the entire contents of which are incorporated herein by reference.

2. BACKGROUND

A general automobile has an electric power steering apparatus (EPS) including an electric motor (hereinafter, referred to simply as a "motor") and a motor control device. The electric power steering apparatus is an apparatus that assists the steering wheel operation of a driver by driving the motor.

In recent years, with the development of automatic driving technology, it is required for the EPS to realize both functions of automatic driving and manual driving. In the case where both functions of automatic driving and manual driving are realized by using one actuator, a technique for switching a control method between the functions has been proposed. Conventionally, there is known a technique of switching control between an assist control unit used to control manual driving and an angle control unit used to control automatic driving by adjusting a weighting factor (that is, ratio) for performing weighted addition between the assist control unit and the angle control unit.

Further reduction of the calculation load is desired.

SUMMARY

A control device according to a non-limiting example embodiment of the present disclosure is a control device to control a motor in an electric power steering apparatus including the motor. The control device includes a processor, and a memory that stores a program to control an operation of the processor, in which the processor executes, according to the program, calculation of a target assist torque by performing proportional integral (PI) control based on a target steering wheel angle and a steering angle, and control of the motor based on the target assist torque, and a gain of an integrator used in integral (I) control of the PI control is variable.

In another non-limiting example embodiment of the present disclosure, a control device to control a motor in an electric power steering apparatus including the motor, includes a processor, and a memory that stores a program to control an operation of the processor, in which the processor executes, according to the program calculation of a target assist torque by performing proportional integral (PI) control based on a target steering wheel angle and a steering angle, switching between enabling and disabling of an integrator used in integral (I) control of the PI control in response to a trigger, and control of the motor based on the target assist torque.

In another non-limiting example embodiment, a motor module of the present disclosure includes a motor, and the control device described above.

In yet another non-limiting example embodiment of the present disclosure, a control method to control a motor in an electric power steering apparatus including the motor, includes calculating a target assist torque by performing proportional integral (PI) control based on a target steering wheel angle and a steering angle, and controlling the motor based on the target assist torque, in which a gain of an integrator used for integral (I) control of the PI control changes according to a steering wheel torque indicating an automatic driving signal.

The above and other elements, features, steps, characteristics and advantages of the present disclosure will become more apparent from the following detailed description of the example embodiments with reference to the attached drawings.

DETAILED DESCRIPTION

Figure 1:
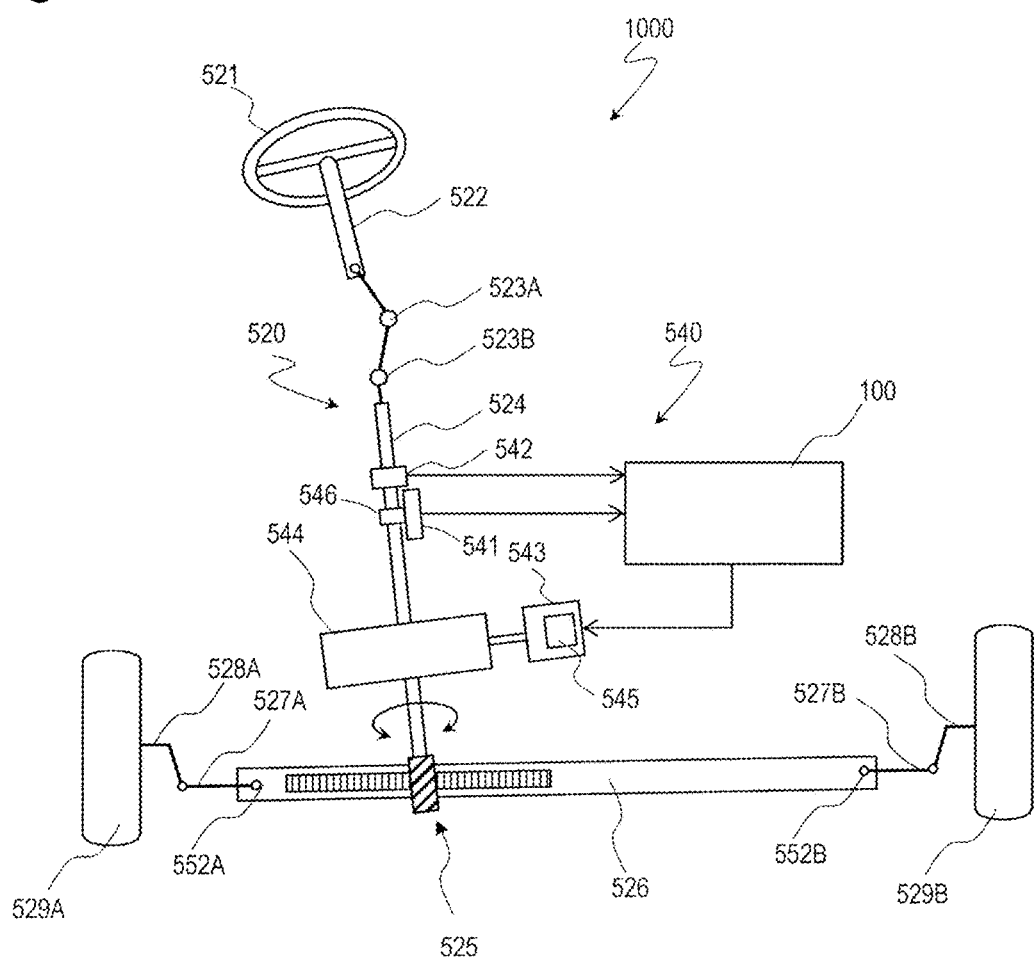
FIG. 1 is a diagram schematically illustrating a configuration example of an electric power steering apparatus 1000 according to an example embodiment of the present disclosure.

Before describing example embodiments of the present disclosure, the discoveries made by the present inventors and the technical background thereof will be described.

In the conventional control device, an assist controller and an angle controller are provided as individual controllers. The assist controller sets a target value of assist torque necessary for manual driving, and the angle controller sets a target value of torque necessary for angle control. An angular deviation depending on an input state of the driver indicating manual driving or automatic driving is input to a shared controller as input information. The shared controller calculates a weighting factor for performing weighted addition based on the target value set by the assist controller and the angle controller, and outputs target assist torque. However, according to this method, it is necessary to simultaneously process the functions of both the assist controller and the angle controller, and a large operation load is applied to the arithmetic circuit. As a result, there is a problem that an expensive arithmetic circuit having a large data processing amount is required.

According to the study of the present inventors, in the control device of an electric power steering apparatus, it is effective to make the gain of the integrator that performs the I control in the PI control variable according to the input target steering wheel angle, and to perform switching between enabling and disabling of the integrator. As a result, the present inventors have found that both functions of the assist controller related to manual driving and the angle controller related to automatic driving can be realized by one angle controller, and have completed the present disclosure.

With reference to the accompanying drawings, hereinafter, a specific description will be given on example embodiments of a control device and a control method for an electric power steering apparatus of the present disclosure as well as an electric power steering apparatus including the control device. However, a specific description more than necessary will not be given in some cases. For example, detailed descriptions of well-known matters and duplicate description of substantially the same configuration may be omitted. This is to avoid unnecessary redundancy of the following description and to facilitate the understanding of those skilled in the art.

The following example embodiments are illustrative, and the control device and the control method for an electric power steering apparatus according to the present disclosure are not limited to the following example embodiments. For example, the numerical values, the steps, the order of the steps, and the like illustrated in the following example embodiments are only illustrative, and various modifications can be made unless any technical inconsistency occurs. The example embodiments described below are illustrative, and various combinations are possible unless any technical inconsistency occurs.

FIG. 1 is a diagram schematically illustrating a configuration example of an electric power steering apparatus 1000 according to the present example embodiment.

The electric power steering apparatus 1000 (hereinafter, referred to as an "EPS") includes a steering system 520 and an assist torque mechanism 540 which generates an assist torque. The EPS 1000 generates the assist torque for assisting the steering torque of the steering system generated when a driver operates a steering wheel. The assist torque reduces the operation load on the driver.

The steering system 520 includes a steering wheel 521, a steering shaft 522, universal joints 523A and 523B, a rotary shaft 524, a rack and pinion mechanism 525, a rack shaft 526, right and left ball joints 552A and 552B, tie rods 527A and 527B, knuckles 528A and 528B, and right and left steered wheels 529A and 529B, for example.

The assist torque mechanism 540 includes a steering torque sensor 541, a steering angle sensor 542, an electronic controller (ECU) 100 for automobiles, a motor 543, a deceleration gear 544, an inverter 545, and a torsion bar 546, for example. The steering torque sensor 541 detects a steering torque in the steering system 520 by detecting the amount of torsion of the torsion bar 546. The steering angle sensor 542 detects a steering angle of the steering wheel. Incidentally, the steering torque may be an estimated value derived from calculation, not a value of the steering torque sensor. The steering angle can also be calculated based on the output value of the angle sensor.

The ECU 100 generates a motor driving signal based on the detection signals detected by the steering torque sensor 541, the steering angle sensor 542, a vehicle speed sensor (not illustrated) mounted on a vehicle, and the like to output the motor driving signal to the inverter 545. For example, the inverter 545 converts direct-current power into three-phase alternating-current power having A-phase, B-phase, and C-phase pseudo sine waves in accordance with the motor driving signal, and supplies the power to the motor 543. The motor 543 is, for example, a surface permanent-magnet synchronous motor (SPMSM) or a switched reluctance motor (SRM), and is supplied with the three-phase alternating-current power to generate assist torque corresponding to the steering torque. The motor 543 transmits the generated assist torque to the steering system 520 via the deceleration gear 544. Hereinafter, the ECU 100 will be referred to as a control device 100 for the EPS.

The control device 100 and the motor are modularized and manufactured and sold as a motor module. The motor module includes the motor and the control device 100 and is suitably used for the EPS. Alternatively, the control device 100 may be manufactured and sold as a control device to control the EPS independently of the motor.

Figure 2:
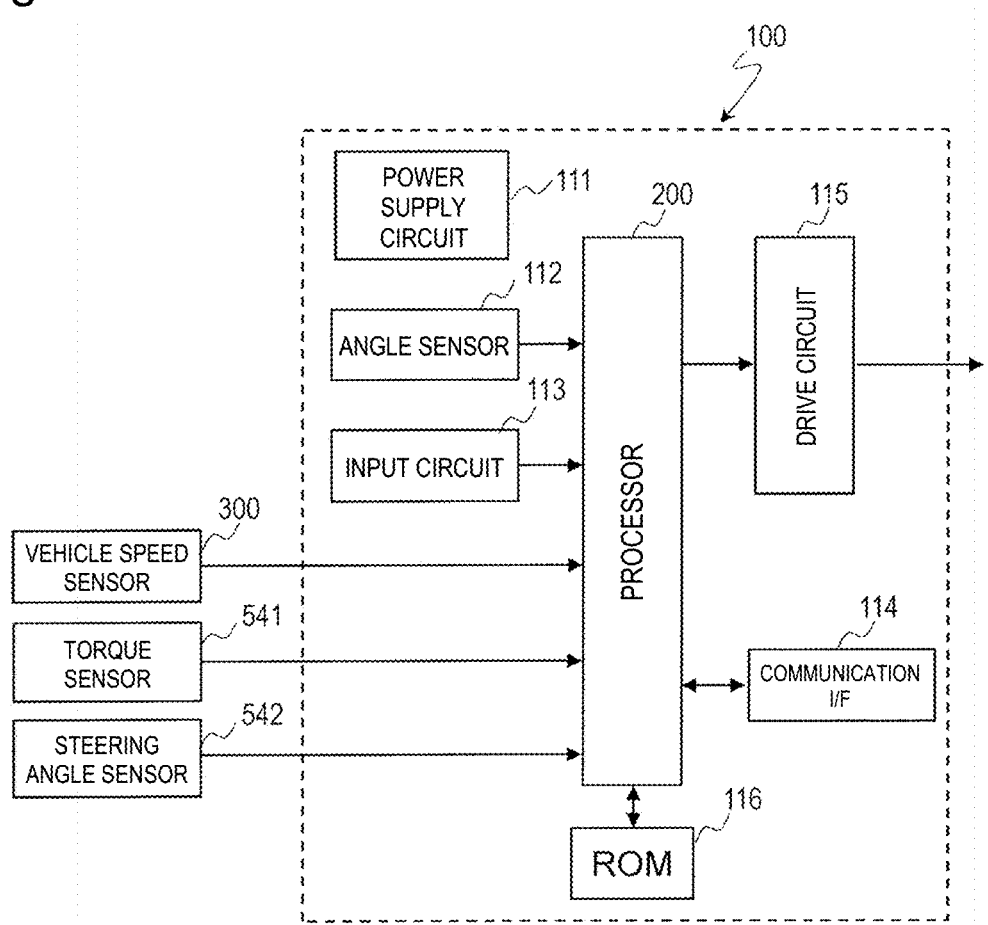
FIG. 2 is a block diagram illustrating a configuration example of a control device 100 according to an example embodiment of the present disclosure.

FIG. 2 is a block diagram illustrating a typical example of a configuration of the control device 100 according to the present example embodiment. The control device 100 includes a power supply circuit 111, an angle sensor 112, an input circuit 113, a communication I/F 114, a drive circuit 115, a ROM 116, and a processor 200, for example. The control device 100 can be realized as a printed circuit board (PCB) on which these electronic components are implemented.

A vehicle speed sensor 300 mounted on the vehicle, the steering torque sensor 541, and the steering angle sensor 542 are electrically connected to the processor 200. The vehicle speed sensor 300, the steering torque sensor 541, and the steering angle sensor 542 transmit a vehicle speed v, steering torque Ts, and a steering angle θ to the processor 200, respectively.

The control device 100 is electrically connected to the inverter 545 (see FIG. 1). The control device 100 controls switching operations of a plurality of switching elements (for example, MOSFETs) included in the inverter 545. Specifically, the control device 100 generates control signals (hereinafter referred to as "gate control signals") for controlling the switching operations of the respective switch elements and outputs the gate control signals to the inverter 545.

The control device 100 generates a torque command value based on the vehicle speed v, the steering torque Ts, and the like, and controls torque and rotation speed of the motor 543 by means of, for example, vector control. The control device 100 can perform not only the vector control but also other closed-loop control. The rotation speed is expressed by the number of revolutions (rpm) at which a rotor rotates per unit time (for example, one minute) or the number of revolutions (rps) at which the rotor rotates per unit time (for example, one second). The vector control is a method in which current flowing through the motor is separated into a current component that contributes to generation of a torque and a current component that contributes to generation of a magnetic flux, and the current components orthogonal to each other are independently controlled.

The power supply circuit 111 is connected to an external power supply (not illustrated) and generates DC voltage required for each block in the circuit. The DC voltage to be generated is, for example, 3 V or 5 V.

The angle sensor 112 is, for example, a resolver or a Hall IC. Alternatively, the angle sensor 112 is also realized by a combination of an MR sensor having a magnetoresistive (MR) element and a sensor magnet. The angle sensor 112 detects a rotation angle of the rotor to output the rotation angle to the processor 200. The control device 100 may include a speed sensor and an acceleration sensor for detecting the rotation speed and acceleration of the motor instead of the angle sensor 112.

The input circuit 113 receives a motor current value (hereinafter, referred to as an "actual current value") detected by a current sensor (not illustrated), converts the level of the actual current value into the input level for the processor 200 as needed, and outputs the actual current value to the processor 200. A typical example of the input circuit 113 is an analog-digital conversion circuit.

The processor 200 is a semiconductor integrated circuit and is also referred to as a central processing unit (CPU) or a microprocessor. The processor 200 sequentially executes a computer program which is stored in the ROM 116 and describes a command set for controlling motor driving, and realizes desired processing. The processor 200 is widely interpreted as a term including a Field Programmable Gate Array (FPGA), an Application Specific Integrated Circuit (ASIC), or an Application Specific Standard Product (ASSP) equipped with a CPU. The processor 200 sets a target current value in accordance with, for example, the actual current value and the rotation angle of the rotor to generate a PWM signal, and outputs the PWM signal to the drive circuit 115.

The communication I/F 114 is an input/output interface for transmitting/receiving data in conformity with an in-vehicle control area network (CAN), for example.

The drive circuit 115 is typically a gate driver (or a pre-driver). The drive circuit 115 generates a gate control signal in accordance with the PWM signal and gives the gate control signal to gates of the plurality of switching elements included in the inverter 545. There is a case where a gate driver is not necessarily required when a driving target is a motor that can be driven at a low voltage. In that case, the functionality of the gate driver may be implemented in the processor 200.

The ROM 116 is electrically connected to the processor 200. The ROM 116 is a writable memory (for example, a PROM), a rewritable memory (for example, a flash memory or an EEPROM), or a read-only memory, for example. The ROM 116 stores a control program including a command set for causing the processor 200 to control motor driving. For example, the control program is temporarily expanded to a RAM (not illustrated) at boot time.

Figure 3:
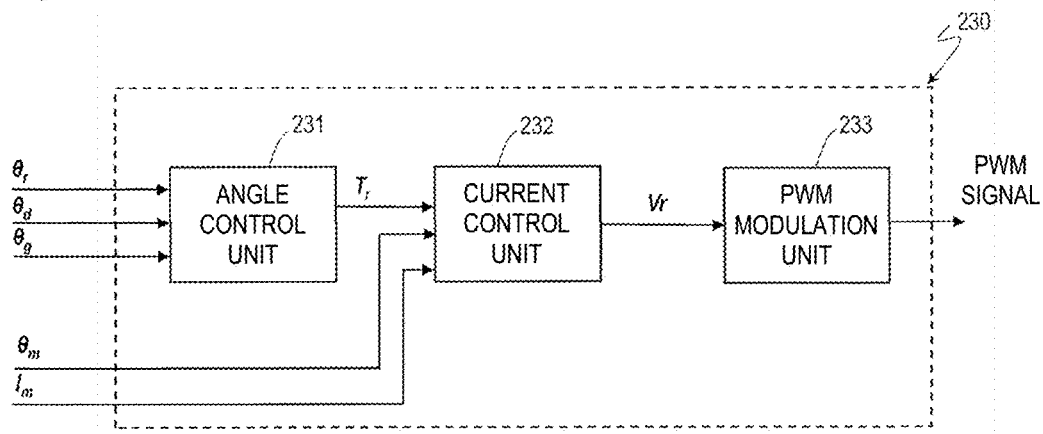
FIG. 3 is a functional block diagram illustrating functional blocks implemented on a processor 200 of an EPS controller 230 according to an example embodiment of the present disclosure.

FIG. 3 is a functional block diagram that illustrates functional blocks, to be implemented on the processor 200, of the EPS controller 230 according to an example embodiment of the present disclosure. The processor 200 in the example embodiment of the present disclosure can be realized by an EPS controller 230 having an angle controller 231, a current controller 232, and a pulse width modulation (PWM) modulation unit 233 as functional blocks. Typically, the processes (or tasks) of the functional blocks corresponding to the respective units are described in the computer program on a software module basis, and are stored in the ROM 116. However, in the case where an FPGA or the like is used, all or some of the functional blocks may be implemented as hardware accelerators.

In the case in which each functional block is implemented as software (or firmware) in the control device 100, a device that executes the software may be the processor 200. In one aspect, the control device according to the present disclosure includes the processor 200 and a memory that stores a program that controls the operation of the processor 200. The processor 200 executes, according to the program, (1) calculation of the target assist torque $T_r$ by performing PI control based on the target steering wheel angle and the steering angle $\theta_g$, and (2) control of the motor based on the target assist torque $T_r$. Controlling the motor based on the target assist torque $T_r$ includes calculating the command voltage Vr by performing current control based on the target assist torque $T_r$, and performing PWM modulation on the command voltage Vr to generate a PWM signal. Here, the gain of the integrator used for the I control of the PI control is variable.

In another aspect, the processor 200 executes, according to the program, (1) calculation of the target assist torque $T_r$ by performing PI control based on the target steering wheel angle and the steering angle $\theta_g$, (2) switching between enabling and disabling of an integrator used for I control of the PI control in response to a trigger, and (3) control of the motor based on the target assist torque $T_r$. Examples of the trigger include a hands-on and hands-off command indicating a hands-on state or a hands-off state, a signal that changes according to a magnitude relationship between a steering wheel torque or a torsion torque indicating an automatic driving signal and a threshold, and a mode command output from a host device. An example of the host device is a host electronic controller (ECU). Details of the trigger will be described later.

In the case where each functional block is implemented in the control device 100 as software and/or hardware, in another aspect, the control device 100 of the present disclosure includes: an angle controller that calculates target assist torque $T_r$ by performing PI control based on a target steering wheel angle and a steering angle $\theta_g$; a current controller that calculates a command voltage Vr by performing current control based on the target assist torque $T_r$; and a PWM modulation unit that generates a PWM signal by applying PWM modulation to the command voltage Vr. Here, the gain of the integrator used for the I control of the PI control is variable. In still another aspect, the control device 100 includes: an angle controller that calculates a target assist torque $T_r$ by performing PI control based on the target steering wheel angle and the steering angle $\theta_g$, and is capable of switching between enabling and disabling of an integrator used for I control of the PI control in response to a trigger; a current controller that calculates a command voltage Vr by performing current control based on the target assist torque $T_r$; and a PWM modulation unit that generates a PWM signal by performing PWM modulation on the command voltage Vr.

The EPS controller 230 calculates the target assist torque $T_r$ by performing PI control based on the target steering wheel angle and the steering angle $\theta_g$. The target steering wheel angle in the example embodiments of the present disclosure may include a manual steering wheel angle $\theta_d$ and an automatic target steering wheel angle $\theta_r$. In the present specification, the manual steering wheel angle $\theta_d$ or the automatic target steering wheel angle $\theta_r$ may be referred to as a target steering wheel angle.

The EPS control device 200 according to the example embodiment of the present disclosure can be regarded as one angle controller. The EPS controller 230 according to the example embodiment of the present disclosure includes an angle controller 231, a current controller 232, and a PWM modulation unit 233. The automatic target steering wheel angle $\theta_r$, the manual steering wheel angle $\theta_d$, and the steering angle $\theta_g$ are input to the EPS controller 230 as input signals. The EPS controller 230 switches the control between the manual driving mode and the automatic driving mode by switching the command value related to the angle including the automatic target steering wheel angle $\theta_r$ and the manual steering wheel angle $\theta_d$ and adjusting the integral term.

The angle controller 231 calculates and outputs the target assist torque $T_r$ based on the automatic target steering wheel angle $\theta_r$ or the manual steering wheel angle $\theta_d$ and the steering angle $\theta_g$. The manual steering wheel angle $\theta_d$ indicates the angle of the steering wheel moved by the driver in the manual driving mode. The automatic target steering wheel angle $\theta_r$ indicates a target value of a steering wheel angle derived from a sensor such as a camera in the automatic driving mode. In the example embodiment of the present disclosure, a gain of an integrator that performs I control in PI control changes according to a target steering wheel angle, and enabling and disabling of the integrator are switched.

In the manual driving mode, the angle controller 231 performs power assist control while causing the steering angle $\theta_g$ to follow the manual steering wheel angle $\theta_d$. The residual deviation in the power assist control is the steering torque. On the other hand, in the automatic driving mode, the angle controller 231 performs control to cause the steering angle $\theta_g$ to follow the automatic target steering wheel angle $\theta_r$ to eliminate the residual deviation. In this manner, both the functions of the assist control involved in the manual driving and the angle control involved in the automatic driving are implemented in one angle controller. The difference in the control between the manual driving mode and the automatic driving mode is the difference in the command value related to the angle, and the presence or absence of an integrator used for I control to be described later.

In the example embodiment of the present disclosure, the EPS controller 230 generally has a manual driving mode and an automatic driving mode, but can further divide the above two modes into four control modes based on a combination of a target steering wheel angle input to the angle controller 231, validity and invalidity of the I control, and a variable gain. Four control modes are listed below. In the following second to fourth control modes, the steering feeling felt by the driver can be appropriately adjusted by changing the gain in the I control according to the target steering wheel angle.

The first control mode is a mode for causing the processor to execute P control based on the manual steering wheel angle $\theta_d$. This mode corresponds to the manual driving mode. The driver can feel the residual deviation of the steering angle with respect to the manual steering wheel angle in the steering as a steering feeling.

The second control mode is a mode for causing the processor to perform PI control based on the manual steering wheel angle $\theta_d$. This mode corresponds to the manual driving mode, but torque is assisted by adding I control. Therefore, the driver is less likely to feel fatigue.

The third control mode is a mode for causing the processor to perform PI control based on the manual steering wheel angle $\theta_d$ and automatic target steering wheel angle $\theta_r$. This mode corresponds to the semi-automatic driving mode. The driver has a sense that the steering wheel angle is further guided.

The fourth control mode is a mode for causing the processor to perform PI control based on the automatic target steering wheel angle $\theta_r$. This mode corresponds to the full automatic driving mode. The driver can cause the vehicle to travel even in a state in which the driver is not on hand.

The function and operation of the angle controller 231 included in the EPS controller 230 will be described in detail with reference to FIGS. 4A to 6.

According to the EPS controller 230 in the present example embodiment, the gain of the integrator used for I control of PI control using a certain signal or command as a trigger is variable. The integrator used for I control in PI control is enabled.

Figure 4A:
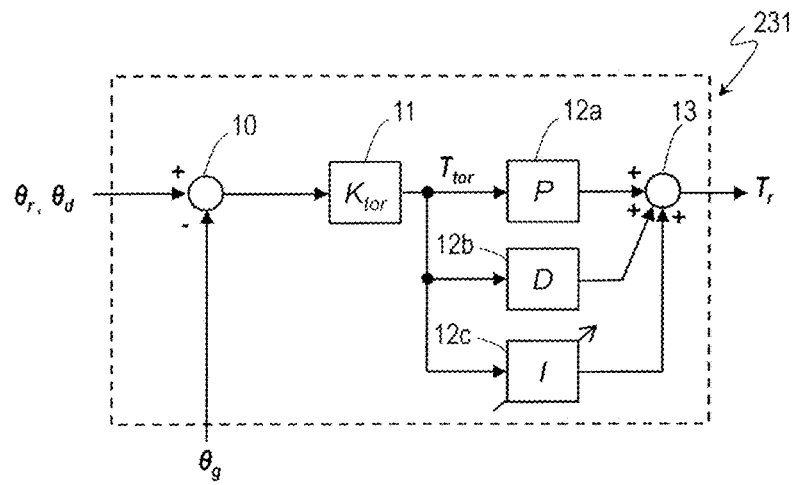
FIG. 4A is a functional block diagram illustrating functional blocks of the angle controller 231 of the EPS controller 230 in a state where an integrator 12$c$ according to a first example embodiment is enabled.
Figure 4B:
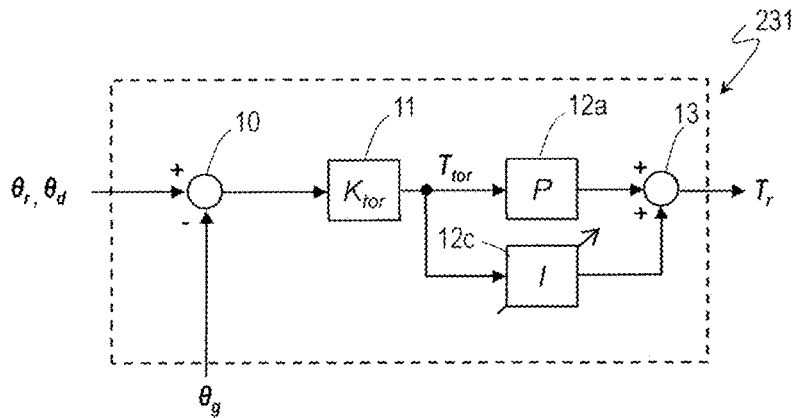
FIG. 4B is a functional block diagram illustrating another configuration of functional blocks of the angle controller 231 in a state where the integrator 12$c$ according to the first example embodiment is enabled.
Figure 5:
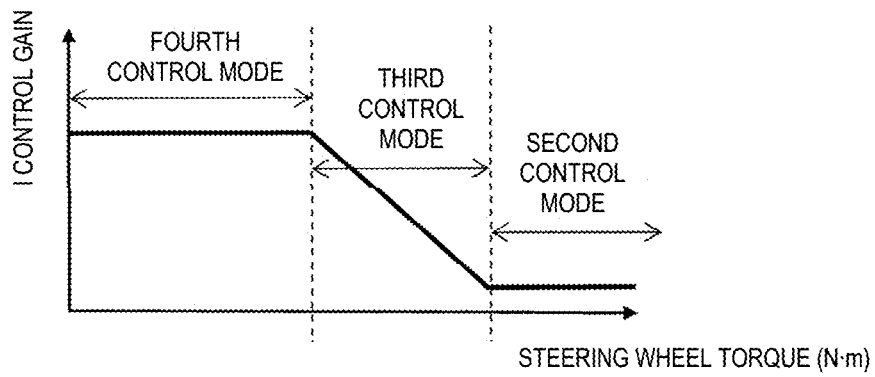
FIG. 5 is a graph illustrating a relationship between a gain or a weight of the integrator 12$c$ with respect to a steering wheel torque $T_h$ according to the first example embodiment.

FIG. 4A is a functional block diagram illustrating functional blocks of the angle controller 231 of the EPS controller 230 in a state where the integrator 12c is enabled. FIG. 4B is a functional block diagram illustrating another configuration of functional blocks of the angle controller 231 in a state where the integrator 12c is enabled. FIG. 5 is a graph illustrating a relationship between a gain or a weight of the integrator 12c with respect to the steering wheel torque $T_h$.

As illustrated in FIG. 4A, the angle controller 231 includes a subtractor 10, a torsion bar rigid unit 11, a P controller 12 a, a D controller 12b, an I controller 12c, and an adder 13. Herein, the I controller may be described as an integrator, and the D controller may be described as a differentiator. The angle controller 231 calculates the target assist torque $T_r$ by performing PI control based on the target steering wheel angle and the steering angle $\theta_g$.

In the example of the graph illustrated in FIG. 5, a state in which the steering wheel torque $T_h$ is not present or a state in which the steering wheel torque $T_h$ is minute even if present is the hands-off state. This mode corresponds to the automatic driving mode. The EPS controller 230 operates in accordance with the fourth control mode. Here, the steering wheel torque $T_h$ indicates an automatic driving signal. In the fourth control mode, the gain of the integrator 12c is maximized, and the gain indicates a constant value without depending on the steering wheel torque $T_h$.

The state in which the steering wheel torque $T_h$ is constantly generated is the manual driving state. The EPS controller 230 operates in accordance with the second control mode. In the second control mode, the gain of the integrator 12c does not become completely 0 and indicates a minute value. However, the value is constant.

An area located between the ranges of the steering wheel torque $T_h$ defining the second and fourth control modes, that is, a transition period from the automatic driving to the manual driving, is the hands-on state. The EPS controller 230 operates in accordance with the third control mode. In the third control mode, as the steering wheel torque $T_h$ increases, the gain of the integrator 12c continuously decreases. However, the present disclosure is not limited to this example, and for example, the gain of the integrator 12c may decrease stepwise or may change non-linearly and continuously.

As illustrated in FIG. 4A, the integrator 12c is enabled regardless of the control mode. As the target steering wheel angle, at least one of the manual steering wheel angle $\theta_d$ and the automatic target steering wheel angle $\theta_r$ is input to the angle controller 231. In the second and third control modes, the deviation between the steering angle $\theta_g$ and the target steering wheel angle including the manual steering wheel angle $\theta_d$ and the automatic target steering wheel angle $\theta_r$ output from the subtractor 10 is input to each of the P controller 12a, the D controller 12b, and the I controller 12c. In the fourth control mode, the deviation between the steering angle $\theta_g$ and the automatic target steering wheel angle $\theta_r$ output from the subtractor 10 is input to each of the controller 12a, the D controller 12b, and the I controller 12c. The adder 13 adds the output values output from the P controller 12a, the D controller 12b, and the I controller 12c, and outputs the target assist torque Tr. However, as illustrated in FIG. 4B, the D controller 12b is not an essential component, and the angle controller 231 may include at least the P controller 12a and the I controller 12c. By using the D controller 12b, responsiveness to instantaneous disturbance can be improved.

The steering wheel torque $T_h$ can be used to determine a hands-on state or a hands-off state. In the example of FIG. 5, the gain of the integrator 12c continuously changes according to the value of the steering wheel torque $T_h$ when the third control mode is selected. By always enabling the integrator 12c, the residual deviation that may remain only by the P control can be set to 0. As a result, it is possible to eliminate an error in the angle generated between the target steering wheel angle and the actual steering angle, and as a result, it is possible to travel along the target travel trajectory. As a modification, a value of the torsion torque $T_{tor}$ can be used instead of the steering wheel torque $T_h$.

Figure 6:
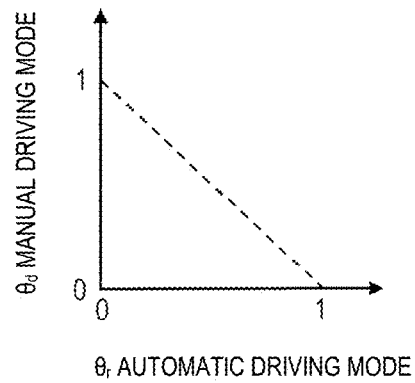
FIG. 6 is a graph illustrating a gain that changes according to a ratio between a manual steering wheel angle $\theta_d$ and an automatic target steering wheel angle $\theta_r$.

FIG. 6 is a graph illustrating a gain that changes according to a ratio between the manual steering wheel angle $\theta_d$ and the automatic target steering wheel angle $\theta_r$. In one aspect, the gain of the integrator 12c may vary depending on the ratio between the manual steering wheel angle $\theta_d$ and the automatic target steering wheel angle $\theta_r$. This ratio, that is, the inclination of the straight line can be determined according to the mode command output from the host device. In the example of FIG. 6, the ratio changes linearly, but is not limited thereto, and may change non-linearly or change stepwise.

FIG. 3 will be referred to again.

As input signals, for example, the target assist torque $T_r$, the motor angle $\theta_m$, and the actual current value $I_m$ are input to the current controller 232. The current controller 232 calculates the command voltage Vr by performing current control based on the target assist torque $T_r$, the motor angle $\theta_m$, and the actual current value $I_m$, in accordance with vector control for example. The PWM modulation unit 233 performs PWM modulation on the command voltage Vr to generate a PWM signal, and outputs the PWM signal to the drive circuit 115.

According to the present example embodiment, since the control of the manual and automatic driving modes is realized by one angle controller, the amount of data to be processed by an arithmetic circuit such as a processor can be reduced as compared with the related art. As a result, the cost of the arithmetic circuit can be suppressed.

An EPS controller 230 according to a second example embodiment will be described with reference to FIGS. 7A to 9. Hereinafter, differences from the EPS controller 230 according to the first example embodiment will be mainly described.

Figure 7A:
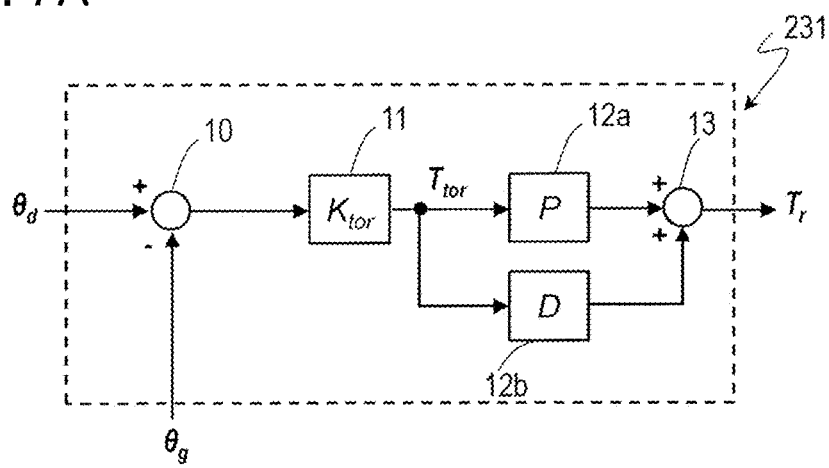
FIG. 7A is a functional block diagram illustrating functional blocks of the angle controller 231 of the EPS controller 230 in a manual driving mode according to a second example embodiment.
Figure 7B:
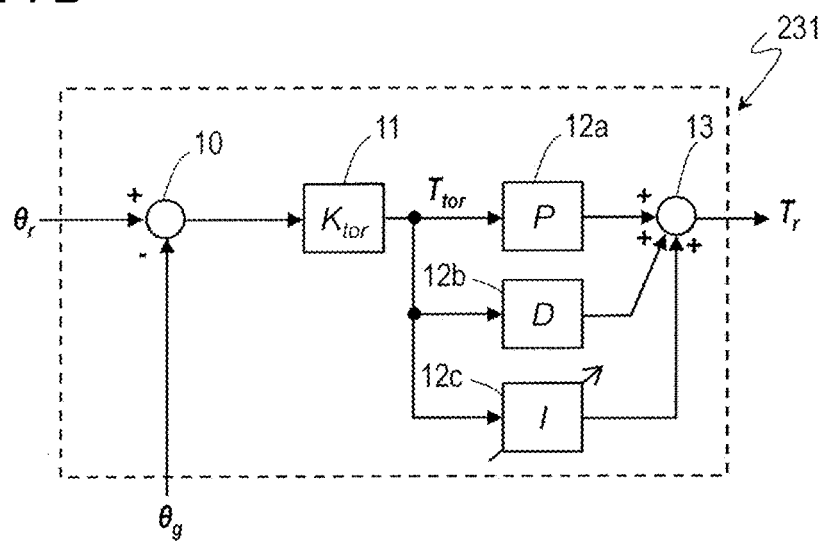
FIG. 7B is a functional block diagram illustrating functional blocks of the angle controller 231 of the EPS controller 230 in an automatic driving mode according to the second example embodiment.
Figure 8A:
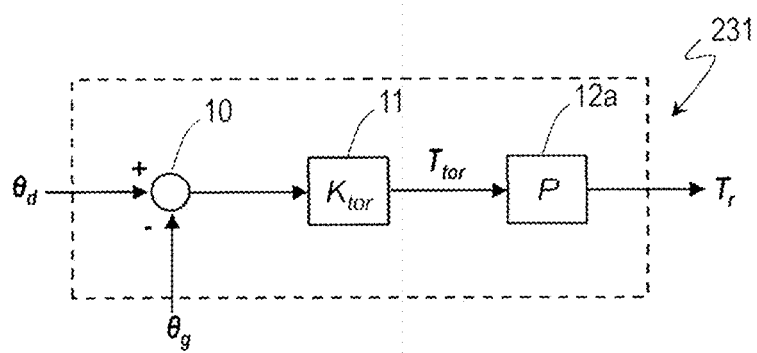
FIG. 8A is a functional block diagram illustrating functional blocks of another configuration of the angle controller 231 of the EPS controller 230 in a manual driving mode according to the second example embodiment.
Figure 8B:
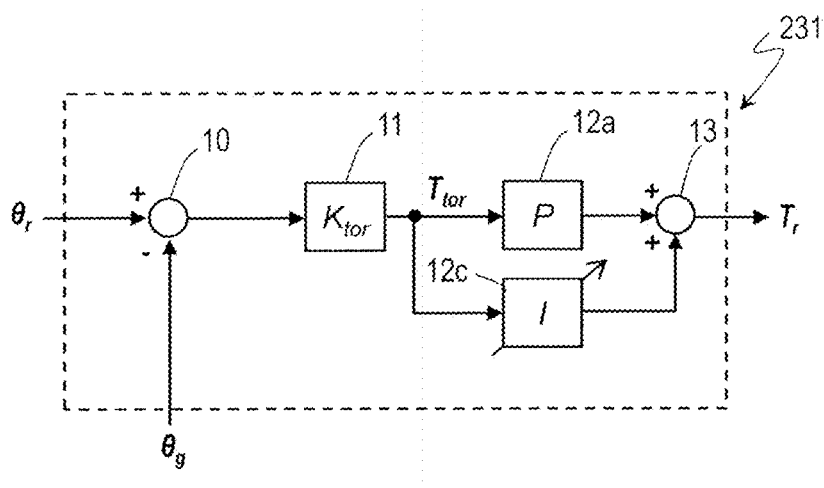
FIG. 8B is a functional block diagram illustrating functional blocks of another configuration of the angle controller 231 of the EPS controller 230 in an automatic driving mode according to the second example embodiment.
Figure 9:
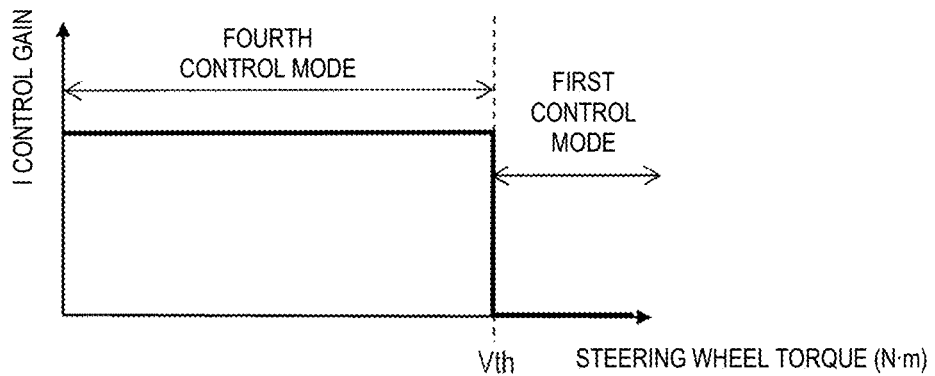
FIG. 9 is a graph illustrating a relationship between a gain of the integrator 12c with respect to a steering wheel torque $T_h$ according to the second example embodiment.

FIG. 7A is a functional block diagram illustrating functional blocks of the angle controller 231 of the EPS controller 230 in the manual driving mode. FIG. 7B is a functional block diagram illustrating functional blocks of the angle controller 231 of the EPS controller 230 in the automatic driving mode. FIG. 8A is a functional block diagram illustrating functional blocks of the angle controller 231 in another configuration of the EPS controller 230 in the manual driving mode. FIG. 8B is a functional block diagram illustrating functional blocks of the angle controller 231 in another configuration of the EPS controller 230 in the manual driving mode. FIG. 9 is a graph illustrating a relationship between a gain of the integrator 12c with respect to the steering wheel torque $T_h$.

The EPS controller 230 according to the present example embodiment switches enabling and disabling of the integrator 12c used for the I control of the PI control by using a certain signal or command as a trigger. As illustrated in FIG. 9, the control mode in the present example embodiment includes a first control mode and a fourth control mode. In a state where the steering wheel torque $T_h$ is not present or in a state where the steering wheel torque $T_h$ is minute even if present, that is, in the hands-off state, the EPS controller 230 operates in accordance with the fourth control mode. The integrator 12c is enabled and its gain can be fixed to a constant value. As illustrated in FIG. 7B, the angle controller 231 calculates the target assist torque Tr based on the automatic target steering wheel angle θr and the steering angle θg. However, as illustrated in FIG. 8B, the differentiator 12b is not essential.

In a state where the steering wheel torque $T_h$ is constantly generated, that is, in the hands-on state, the EPS controller 230 operates in accordance with the first control mode. The integrator 12c is disabled completely, so that its gain is 0. As illustrated in FIG. 7A, the angle controller 231 calculates the target assist torque $T_r$ based on the manual steering wheel angle $\theta_d$ and the steering angle $\theta_g$. However, as illustrated in FIG. 8A, the differentiator 12b is not essential.

Examples of the trigger are a hands-on and hands-off command indicating a hands-on state or a hands-off state, a mode command output from a host device, or a signal that changes according to a magnitude relationship between the steering wheel torque $T_h$ indicating an automatic driving signal and a threshold $V_{th}$. However, the value of the torsion torque $T_{tor}$ can be used instead of the steering wheel torque $T_h$. As illustrated in FIG. 9, the EPS controller 230 operates in accordance with the fourth control mode in a range in which the steering wheel torque $T_h$ is less than the threshold $V_{th}$, and the EPS controller 230 operates in accordance with the first control mode in a range in which the steering wheel torque $T_h$ is equal to or greater than the threshold $V_{th}$.

In the present example embodiment, the angle controller 231 selects one of the manual steering wheel angle $\theta_d$ and the automatic target steering wheel angle $\theta_r$ as an input value used for PI control in response to a hands-on and hands-off command indicating a hands-on state or a hands-off state or a mode command output from a host device. The angle controller 231 switches enabling and disabling of the integrator 12c according to the selected input value. More specifically, the angle controller 231 selects the automatic target steering wheel angle $\theta_r$ as the input value used for the PI control in response to the hands-on and hands-off command indicating the hands-off state, and enables the integrator 12c. On the other hand, the angle controller 231 selects the manual steering wheel angle $\theta_d$ as the input value used for the PI control in response to the hands-on and hands-off command indicating the hands-on state, and disables the integrator 12c.

According to the present example embodiment, similarly to the first example embodiment, since the control of the manual/automatic driving mode is realized by one angle controller, the amount of data processed by an arithmetic circuit such as a processor can be reduced as compared with the related art. As a result, the cost of the arithmetic circuit can be suppressed.

The example embodiments of the present disclosure can be used for a control device to control an EPS mounted on a vehicle.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device to control a motor in an electric power steering apparatus including the motor, the control device comprising:
   a processor; and
   a non-transitory memory that stores a program to control an operation of the processor; wherein
   the processor executes the program to perform:
   calculation of a target assist torque by performing proportional integral (PI) control based on a target steering wheel angle and a steering angle; and
   control of the motor based on the target assist torque; and
   a gain of an integrator used for integral (I) control of the PI control is variable.

2. The control device according to claim 1, wherein the gain of the integrator changes according to a value of a steering wheel torque or a torsion torque indicating an automatic driving signal.

3. The control device according to claim 1, wherein
   the target steering wheel angle includes a manual steering wheel angle and an automatic target steering wheel angle;
   the gain changes according to a ratio between the manual steering wheel angle and the automatic target steering wheel angle; and
   the ratio is determined according to a mode command output from a host device.

4. The control device according to claim 1, wherein the PI control further includes derivative (D) control.

5. A motor module comprising:
   a motor; and
   the control device according to claim 1.

6. The control device according to claim 1, wherein the controlling of the motor based on the target assist torque includes switching between multiple control modes.

7. The control device according to claim 6, wherein the multiple control modes include:
   a first manual driving mode;
   a second manual driving mode which includes assisted torque;
   a semi-automatic driving mode where a driver has a sense that a steering wheel angle is guided; and
   an automatic driving mode.

8. A control device to control a motor in an electric power steering apparatus including the motor, the control device comprising:
   a processor; and
   a non-transitory memory that stores a program to control an operation of the processor; wherein
   the processor executes the program to perform:
   calculation of a target assist torque by performing proportional integral (PI) control based on a target steering wheel angle and a steering angle;
   switching between enabling and disabling of an integrator for use in integral (I) control of the PI control in response to a trigger; and
   control of the motor based on the target assist torque.

9. The control device according to claim 8, wherein the trigger is a hands-on and hands-off command indicating a hands-on state or a hands-off state.

10. The control device according to claim 8, wherein the trigger is a signal that changes according to a magnitude relationship between a steering wheel torque or a torsion torque indicating an automatic driving signal.

11. The control device according to claim 8, wherein the trigger is a mode command output from a host device.

12. The control device according to claim 8, wherein
    the target steering wheel angle includes a manual steering wheel angle and an automatic target steering wheel angle;
    the processor selects one of the manual steering wheel angle and the automatic target steering wheel angle as an input value to be used for the PI control, in response to a hands-on and hands-off command indicating a hands-on state or a hands-off state or a mode command output from a host device; and
    the processor switches enabling and disabling of the integrator according to the input value selected.

13. The control device according to claim 8, wherein the controlling of the motor based on the target assist torque includes switching between multiple control modes.

14. The control device according to claim 13, wherein the multiple control modes include:
    a first manual driving mode;
    a second manual driving mode which includes assisted torque;
    a semi-automatic driving mode where a driver has a sense that a steering wheel angle is guided; and
    an automatic driving mode.

15. A control method to control a motor in an electric power steering apparatus including the motor, the method comprising:
    calculating a target assist torque by performing proportional integral (PI) control based on a target steering wheel angle and a steering angle; and
    controlling the motor based on the target assist torque; wherein
    a gain of an integrator used for integral (I) control of the PI control changes according to a steering wheel torque or a torsion torque indicating an automatic driving signal.

16. The control method according to claim 15, wherein the controlling of the motor based on the target assist torque includes switching between multiple control modes.

17. The control method according to claim 16, wherein the multiple control modes include:
- a first manual driving mode;
- a second manual driving mode which includes assisted torque;
- a semi-automatic driving mode where a driver has a sense that a steering wheel angle is guided; and
- an automatic driving mode.

* * * * *